United States Patent
Sakai et al.

(10) Patent No.: US 10,177,352 B2
(45) Date of Patent: Jan. 8, 2019

(54) BATTERY MODULE

(71) Applicant: KABUSHIKI KAISHA TOYOTA JIDOSHOKKI, Aichi-ken (JP)

(72) Inventors: Takashi Sakai, Kariya (JP); Takayuki Kato, Kariya (JP); Hiromi Ueda, Kariya (JP); Naoto Morisaku, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 189 days.

(21) Appl. No.: 15/507,119

(22) PCT Filed: Aug. 10, 2015

(86) PCT No.: PCT/JP2015/072691
§ 371 (c)(1),
(2) Date: Feb. 27, 2017

(87) PCT Pub. No.: WO2016/035518
PCT Pub. Date: Mar. 10, 2016

(65) Prior Publication Data
US 2017/0288183 A1 Oct. 5, 2017

(30) Foreign Application Priority Data
Sep. 3, 2014 (JP) .................................. 2014-179493

(51) Int. Cl.
*H01M 2/10* (2006.01)
*H01M 2/20* (2006.01)

(52) U.S. Cl.
CPC ....... *H01M 2/1016* (2013.01); *H01M 2/1077* (2013.01); *H01M 2/202* (2013.01); *H01M 2/206* (2013.01)

(58) Field of Classification Search
CPC combination set(s) only.
See application file for complete search history.

(56) References Cited

U.S. PATENT DOCUMENTS

| 9,444,086 B2 | 9/2016 | Shimizu et al. | |
|---|---|---|---|
| 2004/0043663 A1* | 3/2004 | Ikeda | H01M 2/206 439/627 |

(Continued)

FOREIGN PATENT DOCUMENTS

| JP | 2004-95380 | 3/2004 |
|---|---|---|
| JP | 2011-76936 | 4/2011 |

(Continued)

OTHER PUBLICATIONS

International Search Report, along with English-language translation thereof, in PCT/JP2015/072691 dated Nov. 2, 2015.

(Continued)

*Primary Examiner* — Carlos Barcena
(74) *Attorney, Agent, or Firm* — Greenblum & Bernstein, P.L.C.

(57) ABSTRACT

A battery module has battery cells. The battery cells are arranged side by side while being separately held by battery holders. The battery cells are connected in series with bus bars. Each bus bar has a bent portion. Each battery holder includes a protruding wall that is provided between connection terminals adjacent to each other in the direction in which the battery cells are arranged. The protruding walls protrude further than the connection terminals in the direction in which the connection terminals protrude from the cases.

11 Claims, 4 Drawing Sheets

(56) References Cited

U.S. PATENT DOCUMENTS

2011/0076521 A1* 3/2011 Shimizu .............. H01M 2/1061
429/7
2015/0171405 A1 6/2015 Lee

FOREIGN PATENT DOCUMENTS

JP 2012-22895 2/2012
JP 2014-60111 4/2014

OTHER PUBLICATIONS

Written Opinion of the International Searching Authority, along with English-language translation thereof, in PCT/JP2015/072691 dated Nov. 2, 2015.
International Preliminary Report on Patentability in PCT/JP2015/072691 dated Mar. 7, 2017.

* cited by examiner

BATTERY MODULE

TECHNICAL FIELD

The present invention relates to a battery module that has battery cells connected by bus bars.

BACKGROUND ART

Patent Document 1 discloses a battery module that has battery cells connected by bus bars. In Patent Document 1, battery cells are arranged side by side such that connection terminals of different polarities are adjacent to each other. The battery cells are connected in series by connecting adjacent connection terminals with a bus bar.

The battery cells expand as films form on the electrodes due to long-term use. Expansion of the battery cells increases the distance between adjacent battery cells, resulting in stress in the bus bars. The stress in the bus bars may cause the bus bars to come off the battery cells or increase the contact resistance between the battery cells and the bus bars. As a result, the connection state between the bus bars and the battery cells may not be maintained satisfactorily.

PRIOR ART DOCUMENT

Patent Document

Patent Document 1: Japanese Laid-Open Patent Publication No. 2014-60111

SUMMARY OF THE INVENTION

Problems that the Invention is to Solve

An objective of the present invention is to provide a battery module capable of maintaining a satisfactory connection state between battery cells with bus bars even when the battery cells expand.

Means for Solving the Problems

To achieve the foregoing objective and in accordance with a first aspect of the present invention, a battery module is provided that includes a plurality of battery cells, a plurality of bus bars, and a plurality of protruding walls. The battery cells each include an electrode assembly, a case accommodating the electrode assembly, and a connection terminal protruding from the case. The battery cells are arranged side by side such that connection terminals of different polarities are adjacent to each other. The bus bars alternately connect connection terminals that are adjacent to each other in an arrangement direction in which the battery cells are arranged, thereby connecting the battery cells in series. The protruding walls are each provided between bus bars that are adjacent to each other in the arrangement direction. Each protruding wall protrudes further than the connection terminals in a protruding direction in which the connection terminals protrude from the cases. The bus bars protrude in a direction intersecting the arrangement direction and each include a bent portion that is capable of being deformed to extend in the arrangement direction as the battery cells expand.

MODES FOR CARRYING OUT THE INVENTION

A battery module according to one embodiment of the present invention will now be described with reference to FIGS. 1 to 5.

Figure 1A:
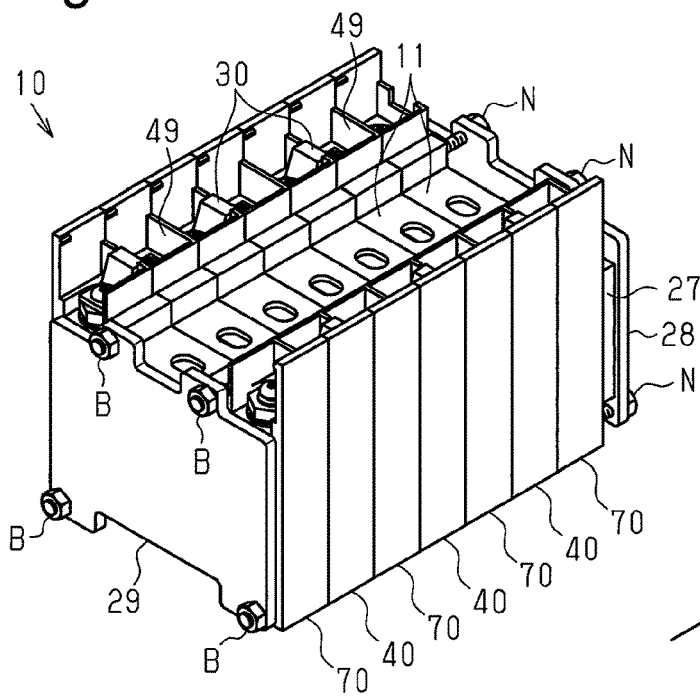
FIG. 1A is a perspective view of a battery module according to one embodiment of the present invention.
Figure 1B:
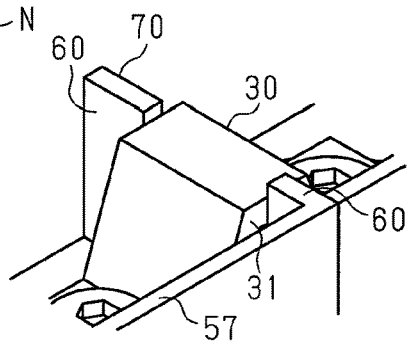
FIG. 1B is a partially enlarged perspective view of the battery module.
Figure 2A:
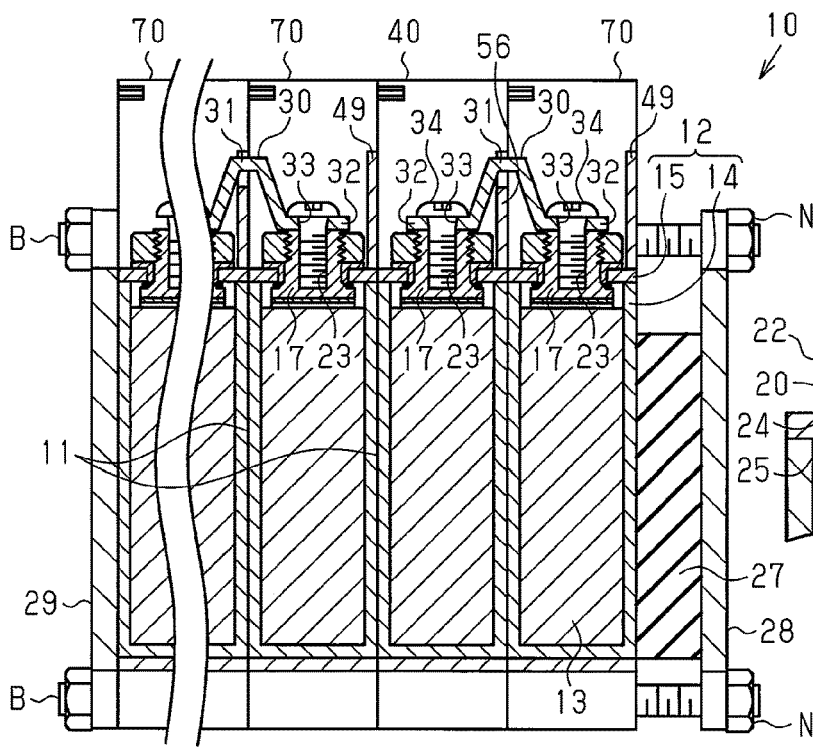
FIG. 2A is a cross-sectional view of the battery module.

As shown in FIGS. 1A, 1B, and 2A, a battery module 10 includes multiple battery cells 11. The battery cells 11 are arranged side by side while being individually held by battery holders 40, 70. The first battery holders 40 and the second battery holders 70 are alternately arranged side by side. The battery holders 40, 70 are made of insulating plastic. The battery cells 11 are arranged side by side such that connection terminals 17 of different polarities are adjacent to each other in an arrangement direction of the battery cells 11. In the following description, the arrangement direction refers to the direction in which the battery cells 11 are arranged. The connection terminals 17 of adjacent battery cells 11 are alternately connected to each other with a bus bar 30. The battery cells 11 are thus connected in series.

The battery cells 11, which are held by the battery holders 40, 70, are sandwiched between a first end plate 28 and a second end plate 29 provided at the opposite ends in the arrangement direction. Bolts B are passed through the second end plate 29 toward the first end plate 28. A nut N is threaded to the distal end of each bolt B, which is passed through the first end plate 28, so that the battery cells 11 held by the battery holders 40, 70 are sandwiched between the first end plate 28 and the second end plate 29. A plate-shaped elastic member 27 is located between the first end plate 28 and the battery cell 11 that is adjacent to the first end plate 28.

Figure 2B:
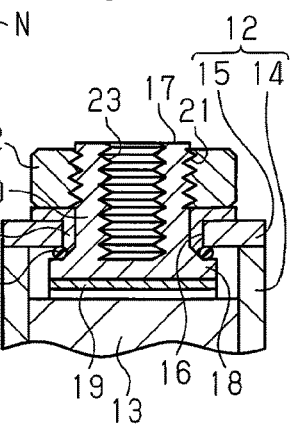
FIG. 2B is a partially enlarged cross-sectional view of a connection terminal of a battery cell.

As shown in FIG. 2B, each battery cell 11 includes a case 12. The case 12 accommodates an electrode assembly 13. The case 12 includes a cylindrical main body 14 with a closed end and a lid 15, which closes the opening of the main body 14. The main body 14 accommodates the electrode assembly 13. The electrode assembly 13 is formed by laminating multiple positive and negative electrodes. The lid 15 has two through-holes 16. A connection terminal 17 protrudes from each through-hole 16. The two connection terminals 17 are a positive terminal and a negative terminal. In the following description, the protruding direction refers to the direction in which the connection terminal 17 protrudes from the case 12.

Each connection terminal 17 has a base portion 18 arranged in the case 12. The base portion 18 is connected to the electrode assembly 13 via a conductive member 19. A columnar shaft 20 extends from the base portion 18. The shaft 20 protrudes from the through-hole 16 to the outside of the case 12. The shaft 20 has an external thread 21 on the outer circumferential surface of part that protrudes out of the case 12. A nut 22 is threaded to the external thread 21 so that the lid 15 is tightly held by the nut 22 and the base portion 18. Accordingly, the connection terminal 17 is fixed to the lid 15. The shaft 20 has a thread hole 23, which extends from the distal end protruding out of the case 12 toward the base portion 18. An internal thread is formed on the inner circumferential surface of the thread hole 23.

A plastic insulating ring 24 is arranged between the inner circumferential surface of the through-hole 16 and the shaft 20 and between the nut 22 and the lid 15. The insulating ring 24 insulates the connection terminal 17 and the lid 15 from each other. An O-ring 25 is arranged on the outer circumferential surface of the proximal end of the shaft 20. The O-ring 25 is arranged between the base portion 18 and the lid 15 to insulate the connection terminal 17 and the lid 15 from each other.

As shown in FIGS. 1B and 2A, each bus bar 30 has an angle bent portion 31. The bent portion 31 is formed by bending the central portion of a metal plate such that the portion protrudes in the thickness direction. The bus bar 30 also has flat connecting portions 32 on the opposite sides of the bent portion 31. Each connecting portion 32 has a through-hole 33, which extends in the thickness direction. Screws 34 are inserted through the through-holes 33 and threaded to the thread holes 23, so that the bus bar 30 is fixed to a corresponding one of the connection terminals 17.

Figure 3A:
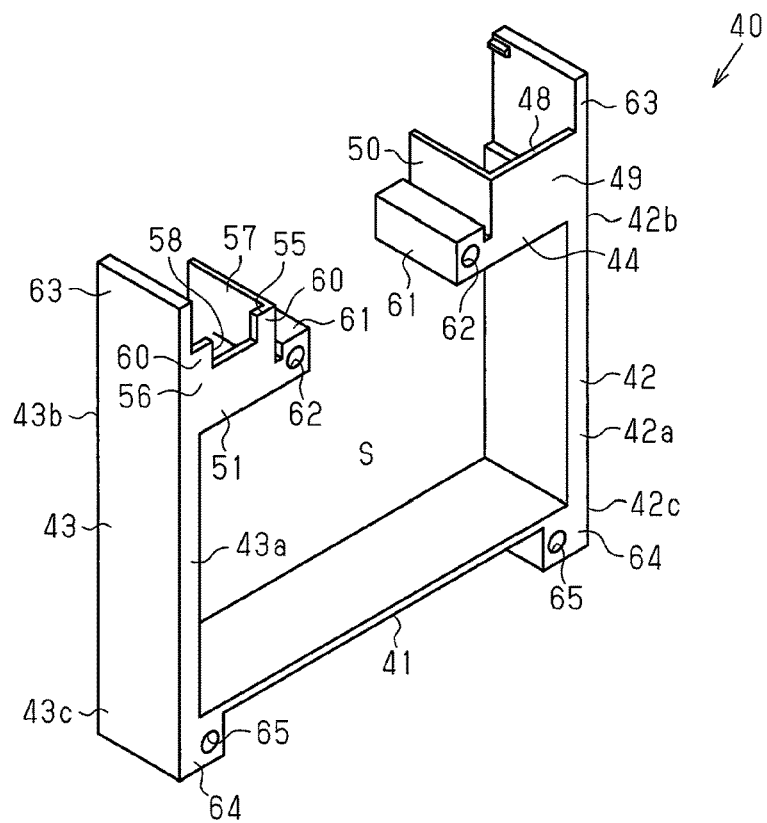
FIGS. 3A and 3B are perspective view of a first battery holder.
Figure 3B:
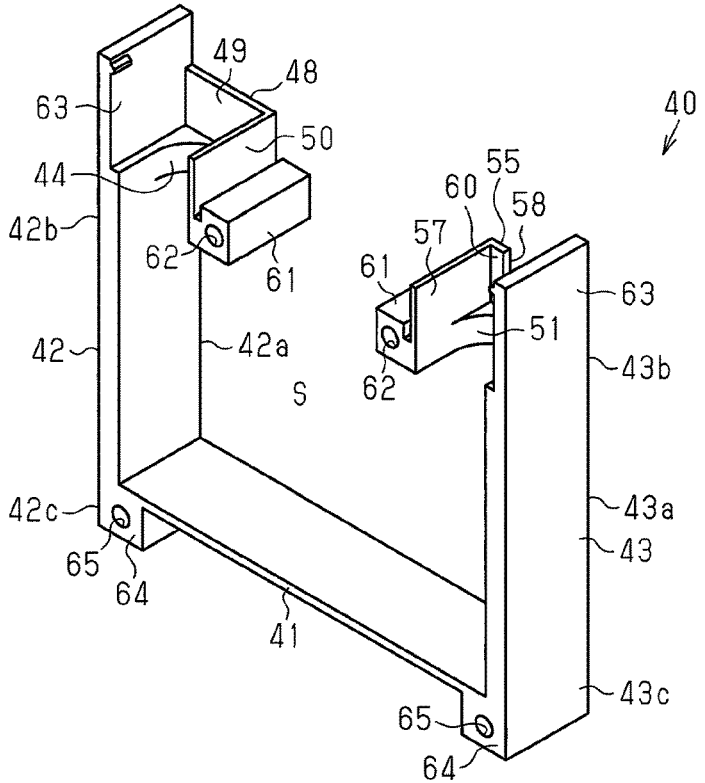

As shown in FIGS. 3A and 3B, each first battery holder 40 includes a rectangular flat plate-shaped first covering wall 41. A second covering wall 42 is provided at one of the opposite ends in the longitudinal direction of the first covering wall 41, and a third covering wall 43 is provided at the other. Each of the second covering wall 42 and the third covering wall 43 is formed in a rectangular flat plate shape and extends in the thickness direction of the first covering wall 41. The area surrounded by the first covering wall 41, the second covering wall 42, and the third covering wall 43 defines an accommodation portion S for accommodating a battery cell 11.

A first terminal accommodating portion 44 is provided on a surface of the second covering wall 42 that defines the accommodating portion S. The first terminal accommodating portion 44 is U-shaped and has an opening in the transverse direction of the second covering wall 42. A first upright wall 48 extends upward from the first terminal accommodating portion 44. The first upright wall 48 has a protruding wall 49, which extends in the direction in which the second covering wall 42 and the third covering wall 43 are opposed to each other. The protruding wall 49 is continuous with a first edge 42a in the transverse direction of the second covering wall 42. A side wall 50 extends from the protruding wall 49 and along the first terminal accommodating portion 44.

A second terminal accommodating portion 51 is provided on the surface of the third covering wall 43 that defines the accommodating portion S. The second terminal accommodating portion 51 is U-shaped and has an opening in the transverse direction of the third covering wall 43. The second terminal accommodating portion 51 has the same shape as the first terminal accommodating portion 44. A second upright wall 55 extends upward from the second terminal accommodating portion 51. The second upright wall 55 has a connecting wall 56, which extends in the direction in which the second covering wall 42 and the third covering wall 43 are opposed to each other. The connecting wall 56 is continuous with a first edge 43a in the transverse direction of the third covering wall 43. The height dimension of the connecting wall 56 from the second terminal accommodating portion 51 is less than the height dimension of the protruding wall 49 from the first terminal accommodating portion 44. The connecting wall 56 includes a pair of partition walls 60 extending upward from the opposite ends of the connecting wall 56. A cutout portion 58 is formed between the partition walls 60. A side wall 57 extends from the connecting wall 56 and along the second terminal accommodating portion 51.

Each of the first and second terminal accommodating portions 44, 51 has a pillar portion 61. The pillar portion 61 has an axis extending in the transverse direction of the covering walls 42, 43. The pillar portion 61 has an insertion hole 62. The insertion hole 62 extends in the axial direction through the pillar portion 61.

The second covering wall 42 and the third covering wall 43 each have a rectangular flat plate-shaped extension wall 63 at first end 42b, 43b in the longitudinal direction. The extension walls 63 are continuous with the second and third covering walls 42, 43 and extend in the longitudinal direction of the second and third covering walls 42, 43.

Also, the second covering wall 42 and the third covering wall 43 have pillar-shaped leg portions 64 at second ends 42c, 43c in the longitudinal direction. The leg portions 64 each have an axis extending in the transverse direction of the covering walls 42, 43. Each leg portion 64 has an insertion hole 65. The insertion hole 65 extends in the axial direction through the leg portion 64.

Figure 4A:
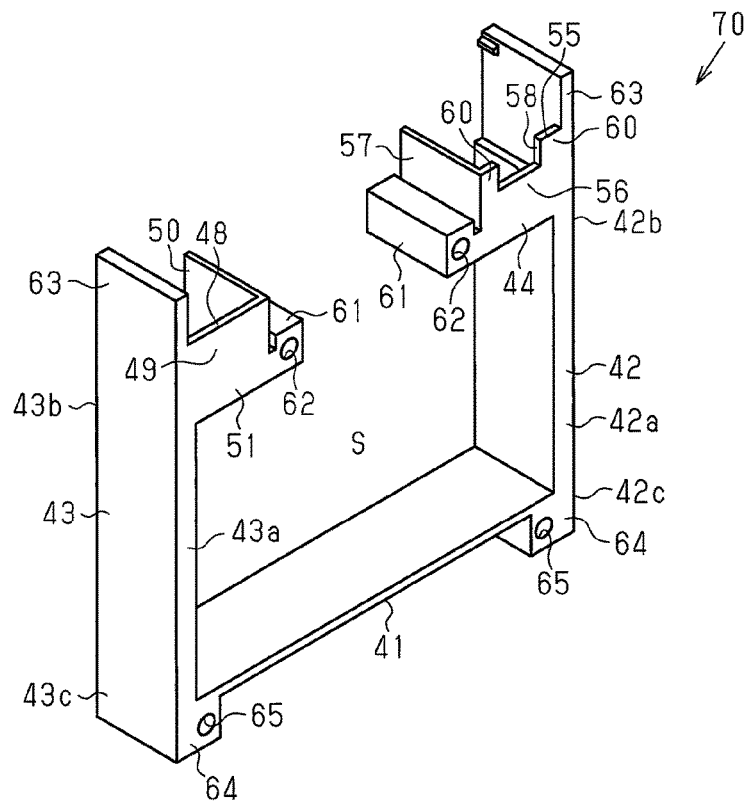
FIGS. 4A and 4B are perspective view of a second battery holder.
Figure 4B:
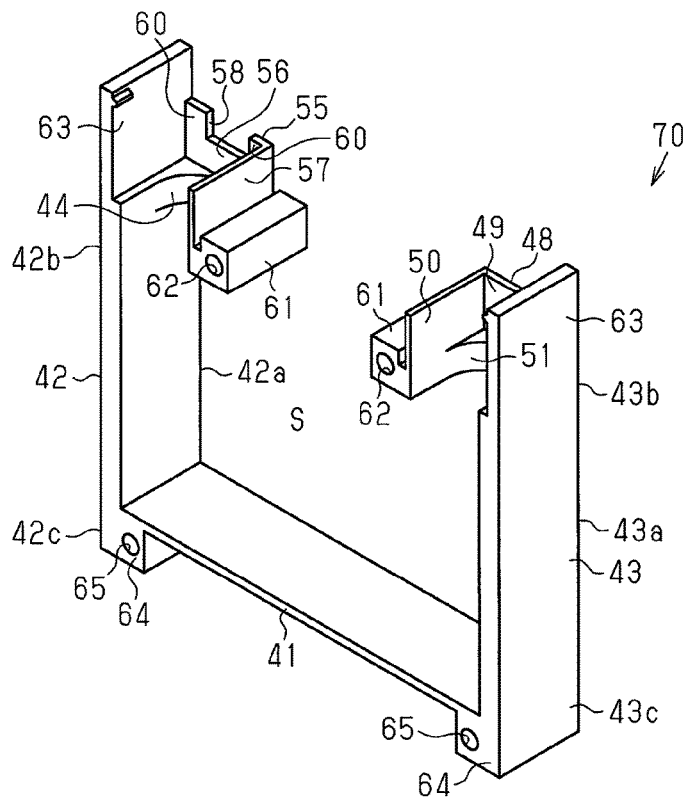

As shown in FIGS. 4A and 4B, the second battery holder 70 has the same configuration as the first battery holder 40 except for the positions of the first upright wall 48 and the second upright wall 55. Thus, the same reference numerals are given to the same components, and description thereof will be omitted.

The positions of the first upright wall 48 and the second upright wall 55 of the second battery holder 70 are reversed from those of the first battery holder 40. The first upright wall 48 of the second battery holder 70 is provided in the second terminal accommodating portion 51, which is continuous with the third covering wall 43. The second upright wall 55 of the second battery holder 70 is provided in the first terminal accommodating portion 44, which is continuous with the second covering wall 42.

As shown in FIGS. 1B and 2A, the battery cells 11 are arranged side by side while being held by the battery holders 40, 70. In this state, either a protruding wall 49 or a connecting wall 56 with partition walls 60 is arranged between connection terminals 17 adjacent to each other in the arrangement direction of the battery cells 11. The protruding wall 49 and the connecting wall 56 with the partition walls 60 protrude further in the protruding direction than the connection terminals 17. The bus bar 30 straddles the connecting wall 56 at the bent portion 31, thereby connecting the connection terminals 17 adjacent to each other in the arrangement direction. The two partition walls 60 of the connecting wall 56 are arranged to sandwich the bent portion 31, which straddles the connecting wall 56, from the opposite sides. Therefore, the peak of the bent portion 31 is located in the cutout portion 58 between the partition walls 60. That is, the two partition walls 60 define the cutout portion 58, which is the installation position of the bus bar 30 with the bent portion 31 located between the partition walls 60. Therefore, the connecting wall 56 with the partition walls 60 is located between the adjacent connection terminals 17 connected to each other by the bus bar 30.

As shown in FIG. 2A, each protruding wall 49 is arranged between bus bars 30 adjacent to each other in the arrangement direction. That is, each protruding wall 49 is arranged between adjacent connection terminals 17 that are not connected to each other by a bus bar 30, in other words, between adjacent connection terminals 17 to which different bus bars 30 are connected. The protruding walls 49 protrude further in the protruding direction than the bent portions 31 of the bus bars 30. More specifically, the protruding wall 49 protrudes further in the protruding direction than the surface of the peaks of the bent portions 31 that face the battery cell 11. Therefore, the protruding length of the bent portion 31 of the bus bar 30 is set to a dimension that allows the bus bar 30 to straddle the connecting wall 56, while inhibiting it from straddling the protruding wall 49.

Operation of the battery module 10 as described above will now be described wither reference to FIG. 5.

When fixing the bus bars 30 to the battery cells 11, for example, a conductive object such as a tool may be dropped. In such a case, the protruding walls 49, which are each located between connection terminals 17 adjacent to each other in the arrangement direction, prevent the connection terminals 17 from being connected to each other by the conductive object. Therefore, it is possible to prevent the battery cells 11 from being short-circuited due to unintentional connection between the connection terminals 17.

Figure 5:
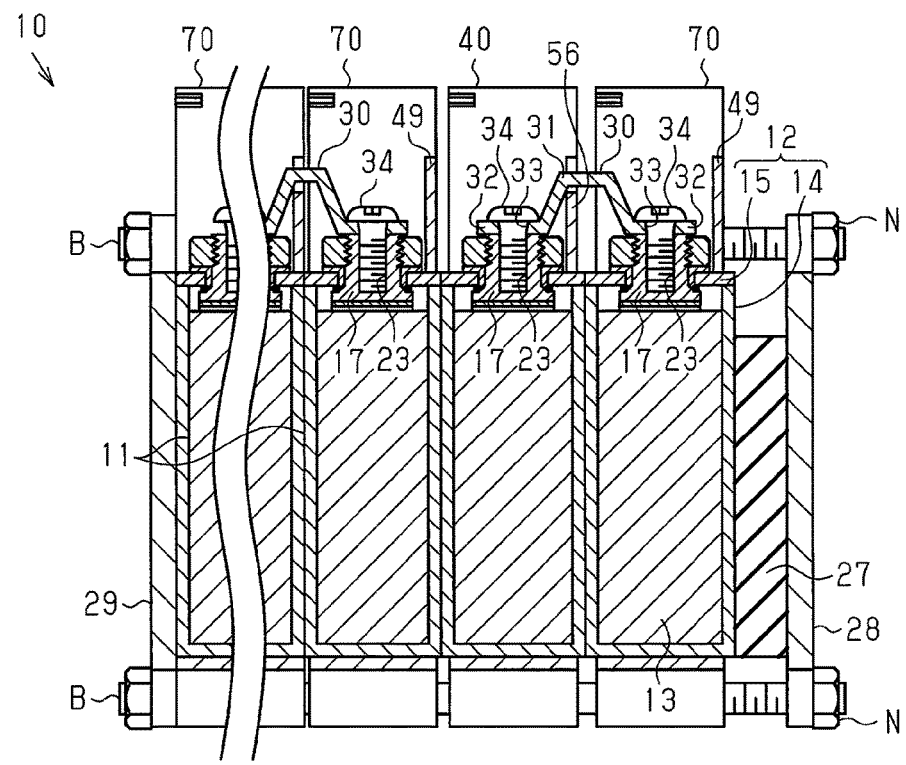
FIG. 5 is a cross-sectional view illustrating operation of the battery module.

Further, with reference to FIG. 5, films form on the electrodes as the battery cells 11 are used. As the thickness of the films increases, the battery cells 11 expand and the distance between adjacent connection terminals 17 in the arrangement direction increases. The stress applied to each bus bar 30 increases, accordingly, and the inclination of the bent portion 31 becomes gentle. That is, the thickness, the width, the inclination angle, and the like of the bent portion 31 are set to allow the bent portion 31 to extend in the arrangement direction of the battery cells 11 when the battery cells 11 expand. Such deformation of the bent portion 31 reduces the stress acting on the bus bar 30.

Excessive expansion of the battery cells 11 prevents the battery cells 11 from performing proper charging and discharging. For this reason, an expansion limit within which the battery cells 11 are capable of performing proper charging and discharging is determined in advance. The protruding length of the bent portion 31 of the bus bar 30 is set such that the bent portion 31 and the connecting wall 56 do not contact each other when the battery cells 11 reach the expansion limit. First, in the battery module 10 at the manufacturing stage, a first distance is obtained that is the distance between connection terminals 17 adjacent to each other in the arrangement direction. Also, a second distance is obtained that is the distance between connection terminals 17 adjacent to each other in the arrangement direction when the battery cells 11 reach the expansion limit. Further, the difference between the first distance and the second distance is obtained, and a shortening length is obtained that is a length by which the bent portion 31 shortens in the protruding direction when the distance between the connecting portions 32 increases by the difference between the first distance and the second distance. When the battery module 10 is manufactured, the protruding length of the bent portion 31 is set such that the separation distance between the bent portion 31 and the connecting wall 56 is greater than the shortening length. Such setting of the protruding length prevents the bent portion 31 from contacting the connecting wall 56 even if the battery cells 11 expand to the expansion limit.

In the present embodiment, an elastic member 27 is located between the first end plate 28 and the battery cell 11 that is adjacent to the first end plate 28. When the battery cells 11 expand, the elastic member 27 is elastically deformed and contracted, thereby absorbing the increase in the load on the end plates 28, 29 due to the expansion of the battery cells 11.

The above-described embodiment achieves the following advantages.

(1) A protruding wall 49 is provided between bus bars 30 adjacent to each other in the arrangement direction. Thus, the battery cells 11 are prevented from being connected at an unintended position by a conductive object. Therefore, since the short circuit of the battery cells 11 is restricted, the battery cells 11 are prevented from being damaged. Also, the bus bars 30 each include a bent portion 31 that protrudes in a direction intersecting the arrangement direction. When the battery cells 11 expand and stress is applied to each bus bar 30, the bent portion 31 is deformed, so that the bus bar 30 is extended in the arrangement direction. This reduces the stress acting on the bus bar 30. Thus, even when stress is applied to the bus bar 30 due to the expansion of the battery cells 11, the connecting portions 32 are unlikely to separate from the connection terminals 17. This limits increase in the contact resistance between the bus bar 30 and the connection terminals 17. In addition, since deformation of the bent portion 31 reduces the stress applied to the bus bar 30 by expansion of the battery cells 11, damage to the bus bar 30 is also prevented. Accordingly, the connection state of the battery cells 11 by the bus bars 30 is maintained at a satisfactory level.

(2) The protruding walls 49 protrude further in the protruding direction than the bent portions 31 of the bus bars 30. Thus, the bus bar 30 cannot be placed to straddle the protruding wall 49 to be attached to the connection terminals 17. This prevents the bus bar 30 from connecting connection terminals 17 of the wrong combination to each other.

(3) A connecting wall 56 is provided between adjacent connection terminals 17 connected by a bus bar 30. The connecting wall 56 protrudes further in the protruding direction than the connection terminals 17. This prevents the adjacent connection terminals 17 from being connected by a foreign object different from the bus bar 30.

(4) A pair of partition walls 60 protrudes from each connecting wall 56 to sandwich the bent portion 31 of the bus bar 30. Since the installation position of the bus bar 30 is defined by a pair of partition walls 60, it is possible to determine the position of the bus bar 30.

(5) A protruding wall 49 is provided in each of the battery holders 40, 70. Therefore, by simply arranging the battery holders 40, 70, each of which holds a battery cell 11, side by side, each protruding wall 49 is easily provided between bus bars 30 adjacent to each other in the arrangement direction of the battery cells 11.

(6) The protruding length of the bent portion 31 is set such that the bent portion 31 and the connecting wall 56 do not contact each other even when the battery cells 11 expand. Therefore, it is possible to prevent the contact resistance between the connection terminals 17 and the bus bar 30 from being increased by the force applied to the bus bar 30 due to contact between the bent portion 31 and the connecting wall 56.

(7) An elastic member 27 is located between the first end plate 28 and the battery cell 11 that is adjacent to the first end plate 28. The elastic member 27 is elastically deformed and contracted to absorb expansion of the battery cells 11. This reduces the load applied to the first end plate 28 and the second end plate 29, so that it is possible to prevent the end plates 28 and 29 from being damaged due to expansion of the battery cells 11.

The above illustrated embodiment may be modified as follows.

Figure 6:
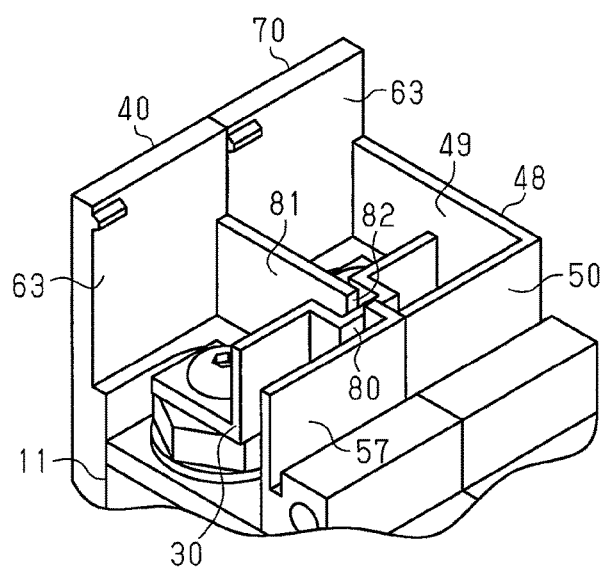
FIG. 6 is a partially enlarged perspective view of a battery module according to a modification.

As shown in FIG. 6, the bus bar 30 may have a bent portion 80 that protrudes in a direction different from the protruding direction. In this case, a connecting wall 81 has a cutout portion 82, which extends through the thickness of the connecting wall 81 and receives the bent portion 80.

The protruding wall 49 only needs to protrude further in the protruding direction than the connection terminals 17, and does not necessarily need to protrude further in the protruding direction than the bent portion 31.

The connecting wall 56 may be omitted.

The connecting wall 56 does not necessarily need to have the partition walls 60, which sandwich the bent portion 31.

The protruding walls 49 may be provided on members different from the battery holders 40, 47. For example, a protruding wall may be provided on the insulating ring 24 of each battery cell 11. Alternatively, a protruding wall may be provided on an insulating plate located between adjacent battery cells 11.

If the influence of contact between the bent portion 31 and the connecting wall 56 is within an allowable range, the bent portion 31 may contact the connecting wall 56 when the battery cells 11 expand.

The battery holders 40, 70 may be omitted. In this case, the protruding walls 49 can be provided on members different from the battery holders 40, 70.

The elastic member 27 may be omitted.

The invention claimed is:

1. A battery module comprising:
a plurality of battery cells that each include an electrode assembly, a case accommodating the electrode assembly, and a connection terminal protruding from the case, wherein the plurality of battery cells are arranged side by side such that connection terminals of different polarities are adjacent to each other;
a plurality of bus bars that alternately connect connection terminals that are adjacent to each other in an arrangement direction in which the plurality of battery cells are arranged, thereby connecting the plurality of battery cells in series;
a plurality of protruding walls each provided between bus bars that are adjacent to each other in the arrangement direction, wherein each protruding wall protrudes further than the connection terminals in a protruding direction in which the connection terminals protrude from the cases; and
a battery holder holding one of the plurality of battery cells,
wherein the plurality of bus bars protrude in a direction intersecting the arrangement direction and each include a bent portion that is capable of being deformed to extend in the arrangement direction as the plurality of battery cells expand, and
wherein the battery holder includes one of the plurality of protruding walls.

2. The battery module according to claim 1, wherein each bent portion protrudes in the protruding direction, and the plurality of protruding walls protrude further than the bent portions in the protruding direction.

3. The battery module according to claim 2, wherein a pair of partition walls is provided between each connection terminals connected by the bus bar, the pair of partition walls protrude further than the bent portions in the protruding direction, and each pair of the partition walls sandwiches one of the bent portions to define an installation position of the bus bar.

4. The battery module according to claim 1, wherein a connecting wall is provided between each connection terminals connected by the bus bar, the connecting walls protrude further than connection terminals in the protruding direction, and each connecting wall is straddled by one of the bent portions.

5. The battery module according to claim 4, wherein each bent portion remains separated from a corresponding one of the connecting walls even when the plurality of battery cells expand.

6. A battery module comprising:
a plurality of battery cells that each include an electrode assembly, a case accommodating the electrode assembly, and a connection terminal protruding from the case, wherein the plurality of battery cells are arranged side by side such that connection terminals of different polarities are adjacent to each other;
a plurality of bus bars that alternately connect connection terminals that are adjacent to each other in an arrangement direction in which the plurality of battery cells are arranged, thereby connecting the plurality of battery cells in series;
a plurality of protruding walls each provided between bus bars that are adjacent to each other in the arrangement direction, wherein each protruding wall protrudes further than the connection terminals in a protruding direction in which the connection terminals protrude from the cases, and
a battery holder holding one of the plurality of battery cells,
wherein the plurality of bus bars protrude in a direction intersecting the arrangement direction and each include a bent portion that is capable of being deformed to extend in the arrangement direction as the plurality of battery cells expand,
wherein each bent portion protrudes in the protruding direction, and the plurality of protruding walls protrude further than the bent portions in the protruding direction,
wherein a pair of partition walls is provided between each connection terminals connected by the bus bar, the pair of partition walls protrude further than the bent portions in the protruding direction, and each pair of the partition walls sandwiches one of the bent portions to define an installation position of the bus bar, and
wherein the battery holder includes the pair of partition walls.

7. The battery module according to claim 6, wherein a connecting wall is provided between each connection terminals connected by the bus bar, the connecting walls protrude further than connection terminals in the protruding direction, and each connecting wall is straddled by one of the bent portions.

8. The battery module according to claim 6, wherein each bent portion remains separated from a corresponding one of the connecting walls even when the plurality of battery cells expand.

9. A battery module comprising:
a plurality of battery cells that each include an electrode assembly, a case accommodating the electrode assembly, and a connection terminal protruding from the case, wherein the plurality of battery cells are arranged side by side such that connection terminals of different polarities are adjacent to each other;

a plurality of bus bars that alternately connect connection terminals that are adjacent to each other in an arrangement direction in which the plurality of battery cells are arranged, thereby connecting the plurality of battery cells in series; and a plurality of protruding walls each provided between the plurality of bus bars that are adjacent to each other in the arrangement direction, wherein each protruding wall protrudes further than the connection terminals in a protruding direction in which the connection terminals protrude from the cases; and a battery holder holding one of the plurality of battery cells, wherein the plurality of bus bars protrude in a direction intersecting the arrangement direction and each include a bent portion that is capable of being deformed to extend in the arrangement direction as the plurality of battery cells expand, wherein a connecting wall is provided between each connection terminals connected by the bus bar, the connecting walls protrude further than connection terminals in the protruding direction, and each connecting wall is straddled by one of the bent portions, wherein each bent portion remains separated from the corresponding one of the connecting walls even when the plurality of battery cells expand, and wherein the battery holder includes the connecting walls.

10. The battery module according to claim 9, wherein each bent portion protrudes in the protruding direction, and the plurality of protruding walls protrude further than the bent portions in the protruding direction.

11. The battery module according to claim 9, wherein a pair of partition walls is provided between each connection terminals connected by the bus bar, the pair of partition walls protrude further than the bent portions in the protruding direction, and each pair of the partition walls sandwiches one of the bent portions to define an installation position of the bus bar.

* * * * *